(12) United States Patent
Allen et al.

(10) Patent No.: US 8,397,099 B2
(45) Date of Patent: Mar. 12, 2013

(54) USING PULSES TO CONTROL WORK INGRESS

(75) Inventors: Nicholas A. Allen, Redmond, WA (US); Justin D. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/879,542

(22) Filed: Sep. 10, 2010

(65) Prior Publication Data

US 2012/0066538 A1 Mar. 15, 2012

(51) Int. Cl.
*G06F 1/04* (2006.01)
*G06F 5/06* (2006.01)
*G06F 9/46* (2006.01)

(52) U.S. Cl. ........ 713/600; 713/400; 713/500; 713/502; 718/100; 718/102; 718/103; 718/104

(58) Field of Classification Search .................. 713/400, 713/500, 502, 600; 718/100, 102, 103, 104
See application file for complete search history.

(56) References Cited

U.S. PATENT DOCUMENTS

| | | | |
|---|---|---|---|
| 7,151,744 B2 | 12/2006 | Sarkinen | |
| 2002/0133530 A1* | 9/2002 | Koning | 709/102 |
| 2004/0015973 A1* | 1/2004 | Skovira | 718/103 |
| 2004/0117791 A1* | 6/2004 | Prasad et al. | 718/100 |
| 2005/0055694 A1 | 3/2005 | Lee | |
| 2005/0097281 A1* | 5/2005 | Tanaka | 711/151 |
| 2007/0213880 A1 | 9/2007 | Ehlers | |
| 2008/0189712 A1* | 8/2008 | Boris | 718/103 |
| 2009/0187783 A1 | 7/2009 | Hansen | |
| 2010/0262975 A1* | 10/2010 | Reysa et al. | 718/105 |

OTHER PUBLICATIONS

VMware White Paper, "ESX Server Performance and Resource Management for CPU-Intensive Workloads", Aug. 4, 2008, 23 pages.
Zeng, Heng et al., "ECOSystem: Managing Energy as a First Class Operating System Resource", ASPLOS X 10/02 San Jose, CA, 2002, 10 pages.
Gopalan, Kartik, et al., "Coordinated Allocation and Scheduling of Multiple Resources in Real-time Operating Systems", Apr. 19, 2008, 10 pages.
Chu, Hao-hua, et al., "A Soft Real Time Scheduling Server in UNIX Operating System", Based on information and belief available, at least as early as Jul. 21, 2010, 10 pages.

* cited by examiner

*Primary Examiner* — Vincent Tran
(74) *Attorney, Agent, or Firm* — Workman Nydeger (57) ABSTRACT

The present invention extends to methods, systems, and computer program products for using pulses to control work ingress. Generally, embodiments of the invention use a variable-speed clock for accepting work for lower-priority services. A clock rate is controlled by a load monitor. The load monitor periodically collects sensor measurements of resources available after allocations by higher-priority services. Based on the sensor measurements, the load monitor adjusts the clock speed up or down (i.e., depending on the amount of resources available after allocations by higher-priority services). At the boundary of the lower-priority service (e.g., where work enters the system), work requests are enqueued to be associated with a future pulse of the clock. Work is accepted or rejected based on a determination of whether the work request can be allocated a clock pulse within a defined period of time.

20 Claims, 4 Drawing Sheets

USING PULSES TO CONTROL WORK INGRESS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In many computing environments, services are consolidated amongst a minimal number of server machines to reduce hardware, licensing, and administrative costs. Consolidation can result in services of differing (e.g., lower and higher) priorities running on a single system. Having services of differing priorities correspondingly introduces a need to allocate system resources, such as processing time, system memory, etc., in a prioritized fashion.

One approach is to budget a static amount of resources for lower priority processes. However, if service utilization by higher priority services is variable, it may be difficult to statically predict a reasonable allocation of resources for lower priority processes, leading to inefficiencies. Dynamic allocation of resources for lower priority processes can be used to compensate to some extent. However, when resources are allocated dynamically, a lower priority process may accept too much or too little work relative to a future amount of resources it will later be allocated.

Additionally, when the cost of cancelling partially completed requests is high, a lower-priority service will also have poor resource utilization. For example, after partially performing a request for a lower-priority request it may be determined that sufficient resources to complete the request are not available. As such, the partially performed request can be cancelled. When a partially completed request is cancelled, the resources used to partially complete the request are essentially wasted.

BRIEF SUMMARY

The present invention extends to methods, systems, and computer program products for using pulses to control work ingress. A computer system includes one or more sensors, a variable speed clock and a pulse controller. For each sensor in the one or more sensors, a sample measurement of the currently availability of a corresponding system resource the sensor is configured to monitor is taken. The utilization of the computer system is determined based on the sample measurement.

A clock rate adjustment is issued to the variable speed clock. The clock rate adjustment instructs the variable speed clock to adjust its clock rate (e.g., up or down) to align more closely with the determined utilization of the computer system. A new clock frequency is calculated based on the current clock frequency and the clock rate adjustment. A time to emit a next clock pulse is calculated based on the new clock frequency. Work is accepted or rejected based on a determination of whether the work request can be allocated a clock pulse within a defined period of time.

In some embodiments, a work request for a lower priority process is accepted. A work ingress component receives a work request for a lower priority process, the work request sent from an external service. The work ingress component creates a work reservation for the work request. The pulse controller enqueues the work reservation in a work queue. The pulse controller returns a work token to the work ingress component. The work token is for tracking the work reservation at the work ingress component.

The pulse controller receives a pulse emitted from the variable speed clock. The clock pulse is emitted in accordance with the clock frequency. The pulse controller dequeues the work reservation from the work queue. The pulse controller notifies the work ingress component, using the work token, that the work reservation has been fulfilled. The work ingress component accepts the work request.

In other embodiments, a work request for a lower priority process is rejected. A work ingress component receives a work request for a lower priority process, the work request sent from an external service. The work ingress component creates a work reservation for the work request. The pulse controller enqueues the work reservation in a work queue. The pulse controller returns a work token to the work ingress component. The work token is for tracking the work reservation at the work ingress component.

The pulse controller determines that a time out interval is to expire prior to receiving an emitted clock pulse for the work reservation. The pulse controller removes the work reservation from the work queue. The pulse controller notifies the work ingress component, using the work token, that the work reservation has not been fulfilled. The work ingress component rejects the work request.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for using pulses to control work ingress. A computer system includes one or more sensors, a variable speed clock and a pulse controller. For each sensor in the one or more sensors, a sample measurement of the currently availability of a corresponding system resource the sensor is configured to monitor is taken. The utilization of the computer system is determined based on the sample measurement.

A clock rate adjustment is issued to the variable speed clock. The clock rate adjustment instructs the variable speed clock to adjust its clock rate (e.g., up or down) to align more closely with the determined utilization of the computer system. A new clock frequency is calculated based on the current clock frequency and the clock rate adjustment. A time to emit a next clock pulse is calculated based on the new clock frequency. Work is accepted or rejected based on a determination of whether a work request can be allocated a clock pulse within a defined period of time.

In some embodiments, a work request for a lower priority process is accepted. A work ingress component receives a work request for a lower priority process, the work request sent from an external service. The work ingress component creates a work reservation for the work request. The pulse controller enqueues the work reservation in a work queue. The pulse controller returns a work token to the work ingress component. The work token is for tracking the work reservation at the work ingress component.

The pulse controller receives a pulse emitted from the variable speed clock. The clock pulse is emitted in accordance with the clock frequency. The pulse controller dequeues the work reservation from the work queue. The pulse controller notifies the work ingress component, using the work token, that the work reservation has been fulfilled. The work ingress component accepts the work request.

In other embodiments, a work request for a lower priority process is rejected. A work ingress component receives a work request for a lower priority process, the work request sent from an external service. The work ingress component creates a work reservation for the work request. The pulse controller enqueues the work reservation in a work queue. The pulse controller returns a work token to the work ingress component. The work token is for tracking the work reservation at the work ingress component.

The pulse controller determines that a time out interval is to expire prior to receiving an emitted clock pulse for the work reservation. The pulse controller removes the work reservation from the work queue. The pulse controller notifies the work ingress component, using the work token, that the work reservation has not been fulfilled. The work ingress component rejects the work request.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention use a variable-speed clock for accepting work for lower-priority services. A clock rate is controlled by a load monitor. The load monitor periodically collects sensor measurements of resources available after allocations by higher-priority services. Based on the sensor measurements, the load monitor adjusts the clock speed up or down (i.e., depending on the amount of resources available after allocations by higher-priority services). At the boundary of the lower-priority service (e.g., where work enters the system), work requests are enqueued to be associated with a future pulse of the clock. Work is accepted or rejected based on a determination of whether the work request can be allocated a clock pulse within a defined period of time.

In some embodiments, a system includes a plurality of processes, with one or more of the processes being higher priority processes ("HPP"s), and one of the processes being a lower priority process ("LPP"). The processes are decoupled so that one process does not necessarily have intimate knowledge of how other processes will behave.

Work requests come in for (both HPP and LPP) processes via one or more points of ingress. A point of ingress could be a web service endpoint, message queue, RPC call, http application, system API, or other means of making a request. Rejecting a work request can be associated some penalty to the system associated with failing to complete the work. Accepting a work request results in a later allocation of system resources. Reneging a work request (i.e., initially accepting and then later deciding to reject) if the later allocation of system resources fails can be associated with greater penalty than initially rejecting the work request.

A system can include a finite amount of resources (e.g., CPU cycles, memory, network bandwidth, storage space, etc.). As such, LPPs compete with any HPPs for resources, with a bias to provide resources to HPPs. For example, a collection of nodes can pull work requests from a queue in a competing consumers fashion. On one of the nodes can be an LPP that is receiving work requests. One or more HPPs unrelated to the work being performed can also use the resources of the system. For example, the work requests may be for an application service while the HPPs may be web servers or email servers. When receiving a work request, the LPP is configured to acknowledge whether it is accepting the work to prevent another consumer from performing the same task. The LPP may have multiple of these ingresses using a variety of different communication mediums.

However, the LPP may not be able to immediately allocate resources corresponding to the work request. For example, allocating resources may include consideration of the work request and possibly even depend on the completion of other, previously received work requests. Thus, a decision whether to accept or reject the work request can be made in advance of being able to attempt to allocate the required resources.

Figure 1:
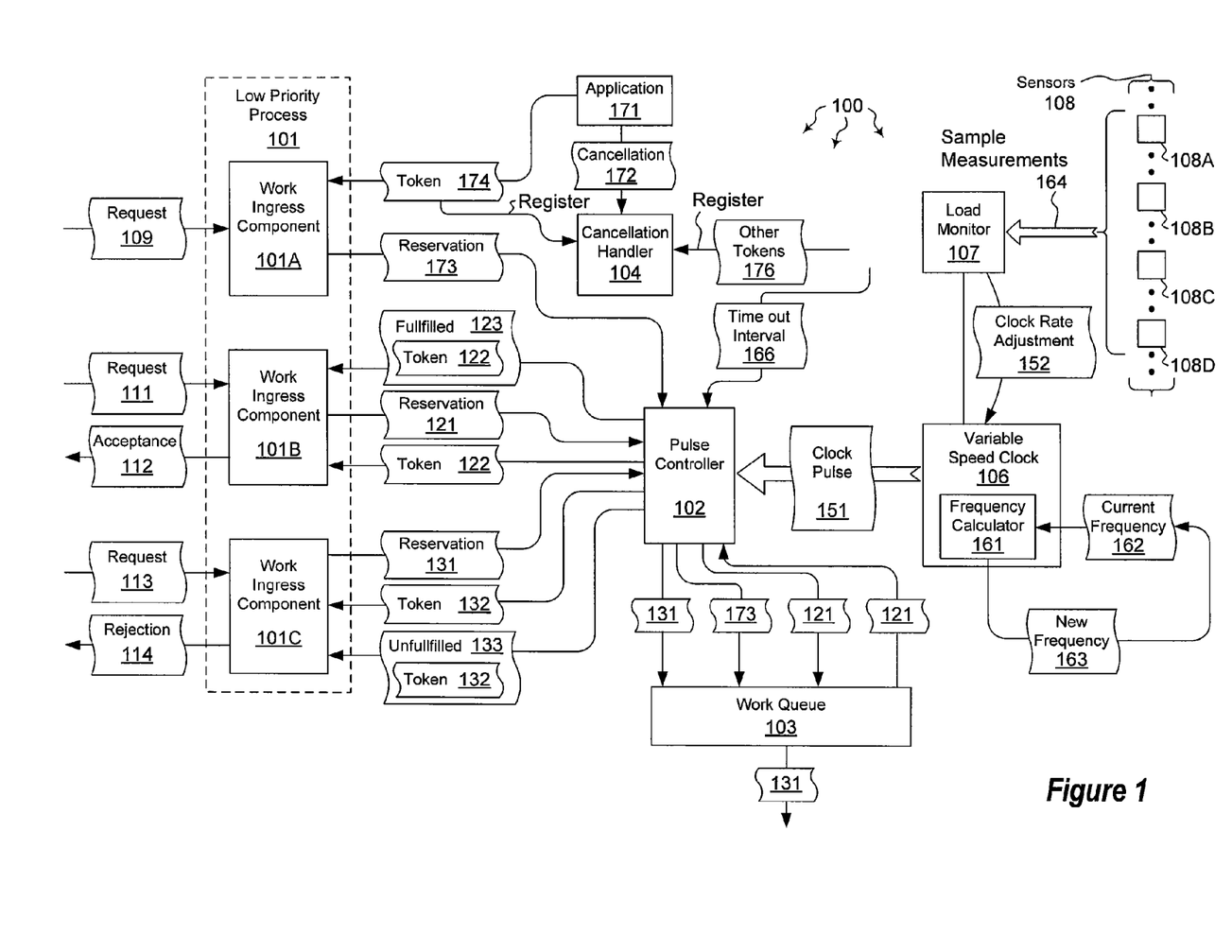
FIG. 1 illustrates an example computer architecture that facilitates using pulses to control work ingress.

FIG. 1 illustrates an example computer architecture 100 that facilitates using pulses to control work ingress. Referring to FIG. 1, computer architecture 100 includes low priority process 101, pulse controller 102, work queue 103, cancellation handler 104, variable speed clock 106, load monitor 107, and sensors 108. Each of the depicted components is connected to one another over (or is part of) a system bus and/or a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, sensors 108 include a plurality of sensors including sensors 108A, 108B, 108C, 108D, etc. Collectively, sensors 108 monitor (e.g., the current and/or instantaneous) availability of resources within computer architecture 100. Further, each sensor can be configured to monitor a particular type of resource. For example, sensor 108A can monitor CPU cycles, sensor 108B can monitor memory, sensor 108C can monitor network bandwidth, sensor 108D can monitor storage space, etc.

Sensors 108 can transmit signals indicating what has been monitored to load monitor 107. For example, a sensor monitoring CPU cycles can indicate the number of CPU cycles in use at a specified time, a sensor monitoring memory can indicate the amount of memory in use at a specified time, etc.

Based on signals received from sensors 108, load monitor 107 determines if computer architecture 100 has sufficient resources available for any HPPs. A variety of different mechanisms can be used to determine whether computer architecture 100 has sufficient resources available for any HPPs, including but not limited to instantaneous sensor measurements, rate of change comparisons of sensor measurements versus past measurements, observed correspondence between sensor measurements and a particular clock rate, control signals generated by a user or administrator, control signals generated by one or more HPPs, and control signals generated by other system processes.

Based on the availability of resources for HPPs, load monitor 107 can determine if the resources of computer architecture 100 are under-utilized or over-utilized. Under utilization can indicate that the resource needs of HPPs are being satisfied and that other resources are unused and available. Over utilization can indicate that the resource needs of HPPs are not being satisfied or that minimal resources remain unused and available such that if new HPPs request resources the requests may not be satisfied.

Based on resource utilization, load monitor 107 can instruct variable speed clock 106 to adjust its clock rate. For example, load monitor 107 can instruct variable speed clock 106 to adjust is clock rate up if resources of computer architecture 100 are determined to be under-utilized (i.e., relevant resources remain unused after sufficient resources are made available for HPPs). On the other hand, load monitor 107 can instruct variable speed clock 106 to adjust its clock rate down if resources of computer architecture 100 are determined to be over-utilized.

Variable speed clock 106 is configured to send a pulse each time a work (resource) request for an LPP can be satisfied. Pulses can be sent at a specified frequency. Variable speed clock 106 can adjust the specified frequency based on received clock rates adjustments. For example, variable speed clock 106 can calculate a new frequency based on a clock rate adjustment and a current frequency. From a new frequency, variable speed clock 106 can calculate when to emit a next pulse.

Figure 2:
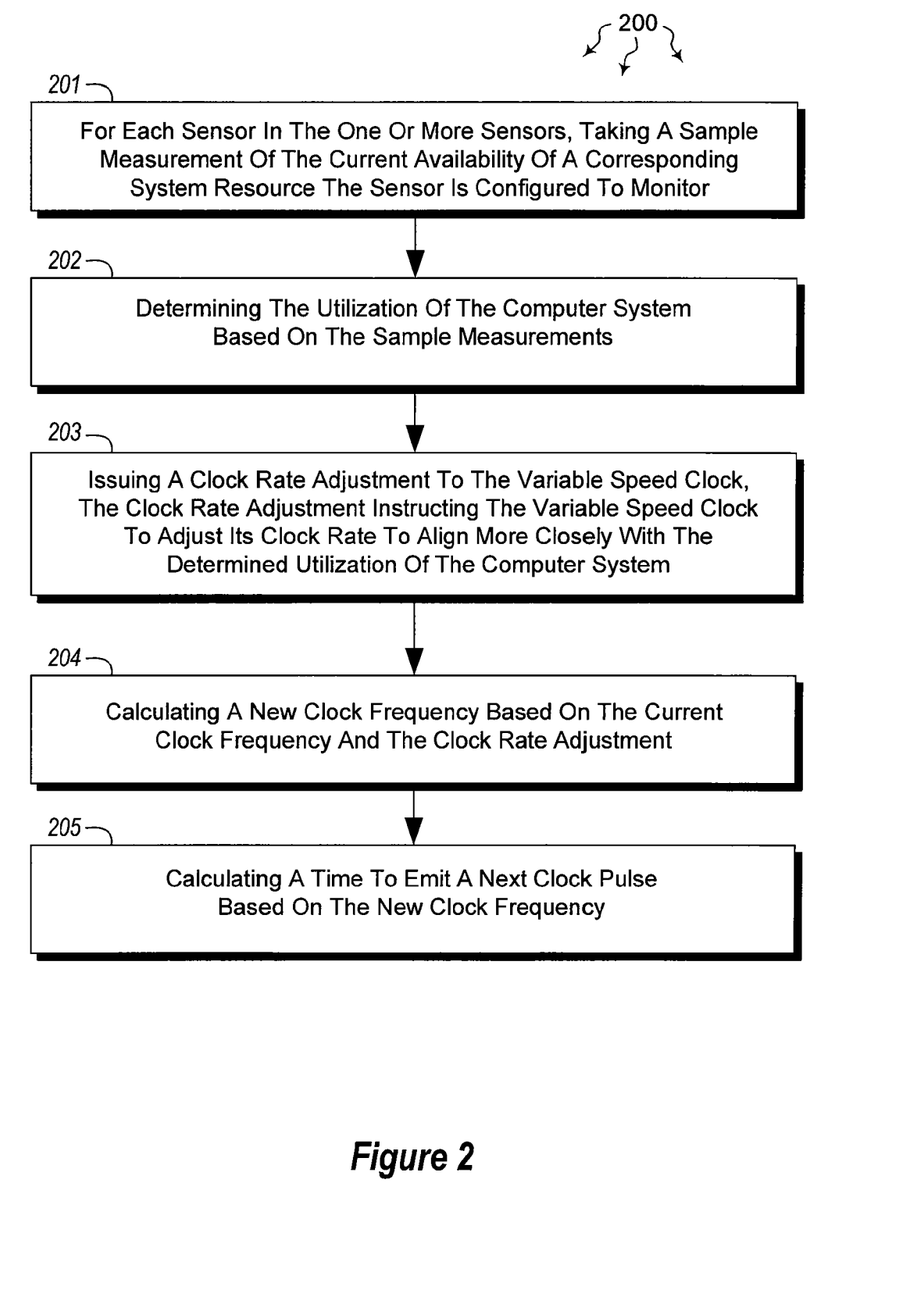
FIG. 2 illustrates a flow chart of an example method for adjusting the frequency of a clock pulse.

FIG. 2 illustrates a flow chart of an example method 200 for adjusting the frequency of a clock pulse. Method 200 will be described with respect to the components and data of computer architecture 100.

Method 200 includes an act of for each sensor in one or more sensors, an act of taking a sample measurement of the current availability of the corresponding system resource the sensor is configured to monitor (act 201). For example, sensors 108A, 108B, 108C, 108D, etc. can take sample measurements of the currently availability of resources. Each sensor of sensors 108 can take a sample of a corresponding resource, such as, for example, CPU cycles, system memory, network bandwidth, storage space, etc. Sensors 108 can send sample measurements 164 to load monitor 107.

Method 200 includes an act of determining the utilization of the computer system based on the sample measurements (act 202). For example, load monitor 107 can determine the (e.g., resource) utilization of computer architecture 100 based on sample measurements 164. Based on an (e.g., administrator defined) internal model for computer architecture 100, load monitor 107 can tell if computer architecture 100 is under-utilized (e.g., by HPP) or over-utilized (e.g., by HPP).

In some embodiments, an artificial resource pressure level is specified for a system resource. Generally, a system can pre-allocate a system resource for HPPs in accordance with a specified resource pressure level. A determined resource utilization for a system resource can also be adjusted by a specified resource pressure level. For example, a memory pressure can be used to manage memory using garbage collection to cause the garbage collector to work harder to reclaim an object than would ordinarily be determined by a garbage collector heuristic.

Method 200 includes an act of issuing a clock rate adjustment to the variable speed clock, the clock rate adjustment instructing the variable speed clock to adjust its clock rate to align more closely with the determined utilization of the computer system (act 203). For example, based on determined utilization, load monitor 107 can formulate clock rate adjustment 152. Clock rate adjustment 152 can indicate that the clock rate of variable speed clock 106 is to be adjusted up or down. For example, when computer architecture 101 is under-utilized, clock rate adjustment 152 can indicate that the clock rate of variable speed clock 106 is to be adjusted up (resulting in emitting more frequent pulses and thus more processing of lower priority work). On the other hand, when computer architecture 101 is over-utilized, clock rate adjustment 152 can indicate that the clock rate of variable speed clock 106 is to be adjusted down (resulting in emitting less frequent pulses and thus less processing of lower priority work).

Method 200 includes an act of calculating a new clock frequency based on the current clock frequency and the clock rate adjustment (act 204). For example, frequency calculator 161 can calculate new frequency 163 based on clock rate adjustment 152 and current frequency 162. When computer architecture 100 is under-utilized, new frequency 163 can be greater than current frequency 162. On the other hand, when computer architecture 100 is over-utilized, new frequency 163 can be less than current frequency 162

Method 200 includes an act of calculating a time to emit a next clock pulse based on the new clock frequency (act 205). For example, variable speed clock 106 can calculate a time to emit clock pulse 151 based on new frequency 163.

In some embodiments, variable speed clock 106 has a finite-resolution timer source that is less precise than the requested clock frequency. For example, variable speed clock 106 may be implemented using a system timer that has 16 ms resolution while the requested clock frequency is 200 pulses per second (requiring a pulse every 5 ms). Variable speed clock 106 can resolve this discrepancy by computing, for each firing of the system timer, the number of pulses that should actually have been emitted during the elapsed time from the current time to the previous time a pulse was emitted, taking into account any previous adjustments. Variable speed clock 106 then emits pulses according to the computed number. Variable speed clock 106 can also adjust the next pulse time based on the remaining fractional pulse after emitting the computed number of pulses.

In other embodiments, variable speed clock 106 can resolve discrepancy between a timer source and requested clock frequency by calculating, each time the timer source fires, a schedule for the time at which each pulse should have been emitted. The schedule can start with the pulse after the last one to have actually been emitted and proceeding until a next pulse would be scheduled for after the current system time, and emitting each pulse scheduled for no later than the current system time.

Returning back to FIG. 1, computer architecture 100 also includes low priority process 101. Low priority process 101 further includes work ingress components 101A, 101B, 101C, etc. Each work ingress component is configured to receive external work requests and provide a response to accept or reject work requests. When a work request is received at an ingress component, the ingress component sends a reservation to pulse controller 102.

Pulse controller 102 receives reservations from work ingress components and queues received reservations in work queue 103. Reservations can be queued and held in work queue 103 in priority order until a reservation can be matched to an emitted pulse from variable speed clock 106.

Cancellation handler 104 coordinates the cancellation of work with voiding a work reservation request.

Figure 3:
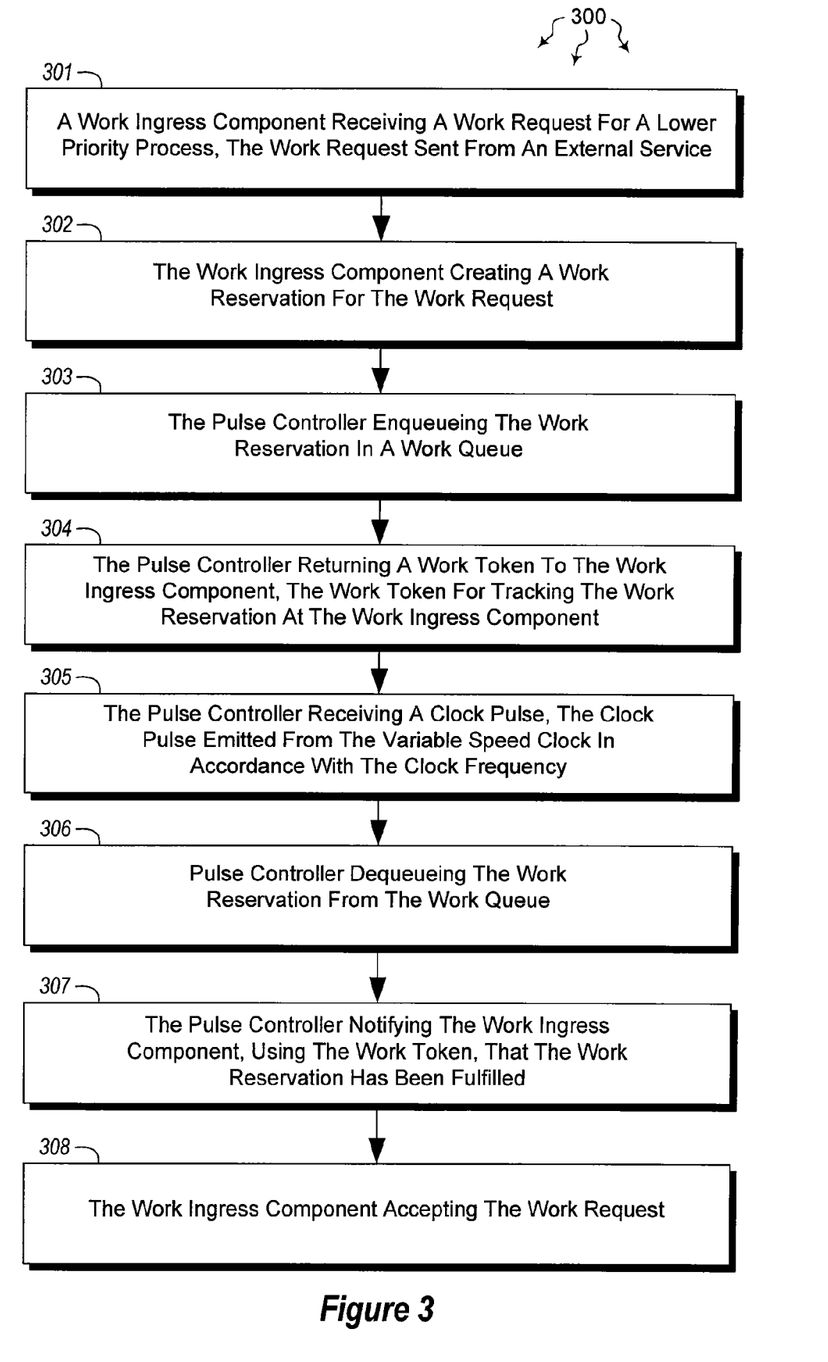
FIG. 3 illustrates a flow chart of an example method for accepting a work request for a lower priority process.

FIG. 3 illustrates a flow chart of an example method 300 for accepting a work request for a lower priority process. Method 300 will be described with respect to the components and data of computer architecture 100.

Method 300 includes an act of a work ingress component receiving a work request for a lower priority process, the work request sent from an external service (act 301). For example, work ingress component 101B can receive request 111 for low priority process 101. Request 111 can be sent from an external service, such as, for example, a Web service, a further message queue, an HTTP application, etc.

Method 300 includes an act of the work ingress component creating a work reservation for the work request (act 302). For example, work ingress component 101B can create reservation 121 for request 111. Work ingress component 101B can send reservation 121 to pulse controller 102. Pulse controller 102 can receive reservation 121 from work ingress component 101B.

Method 300 includes an act of the pulse controller enqueueing the work reservation in a work queue (act 303). For example, pulse controller 102 can enqueue reservation 121 in work queue 103. Method 300 includes an act of the pulse controller returning a work token to the work ingress component, the work token for tracking the work reservation at the work ingress component (act 304). For example, pulse controller 102 can create token 122 and send token 122 to ingress component 101B. Work ingress component 101B can receive token 122 from pulse controller 102. Work ingress component 101B can use token 122 to track reservation 121.

Method 300 includes an act of the pulse controller receiving a pulse, the clock pulse emitted from the variable speed clock in accordance with the clock frequency (act 305). For example, subsequent to reservation 121 reaching the front of work queue 103, pulse controller 102 can receive pulse 151. Method 300 includes an act of the pulse controller dequeueing the work reservation from the work queue (act 306). For example, pulse controller 102 can dequeue reservation 121 from work queue 103 in response to receiving clock pulse 151.

Method 300 includes an act of the pulse controller notifying the work ingress component, using the work token, that the work reservation has been fulfilled (act 307). For example, pulse controller 102 can send fulfilled 123, including work token 122, to work ingress component 101B. Work ingress component 101B can receive fulfilled 123 from pulse controller 102. Fullfilled 123 indicates that work reservation 121 has been fulfilled (i.e., that resources are and/or can be allocated to perform work requested in request 111). Method 300 includes an act of the work ingress component accepting the work request (act 308). For example, work ingress component 101B can send acceptance 112 for request 111 in response to receiving fulfilled 123. Acceptance 112 can include an acknowledgement for work request 111. Acceptance 112 can be transmitted back to an external service that sent request 111.

Figure 4:
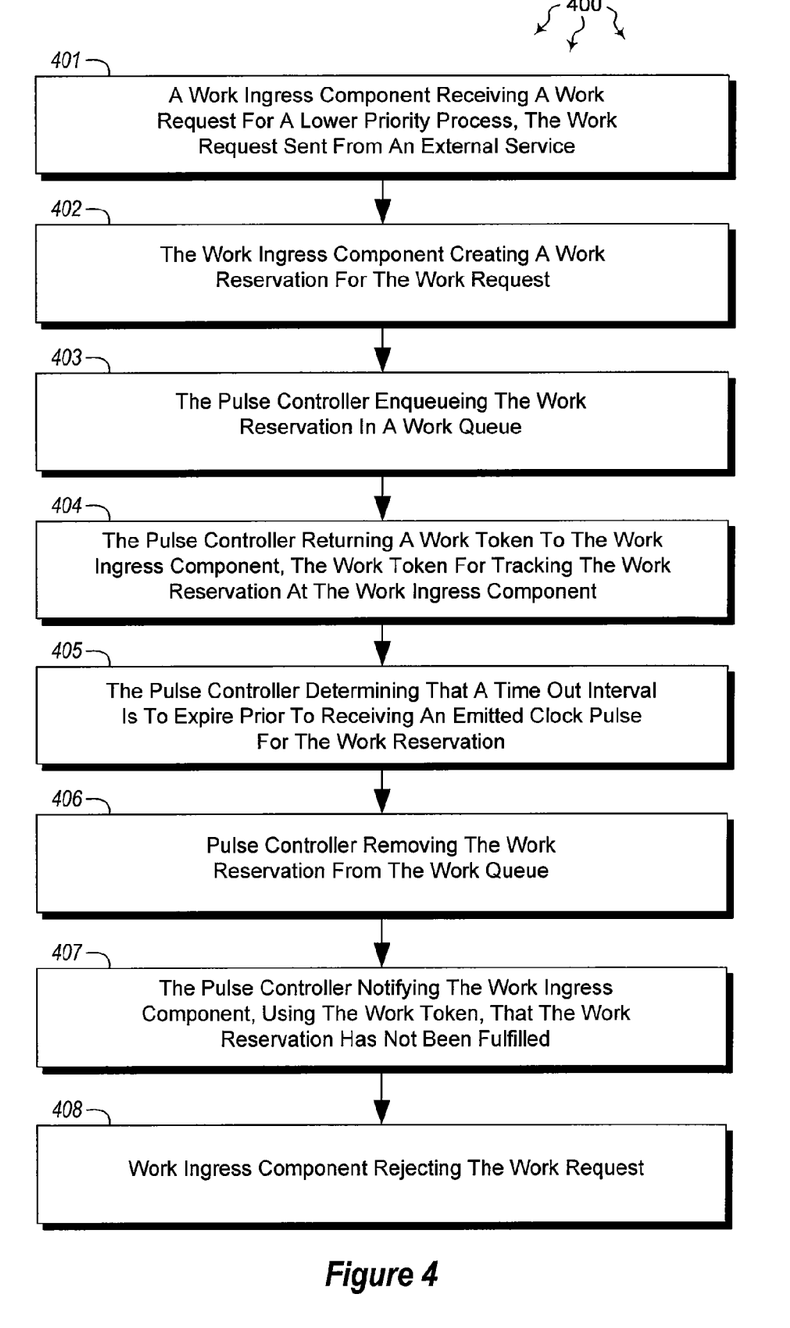
FIG. 4 illustrates a flow chart of an example method for rejecting a work request for a lower priority process.

FIG. 4 illustrates a flow chart of an example method 400 for rejecting a work item for a lower priority process. Method 400 will be described with respect to the components and data of computer architecture 100.

Method 400 includes an act of a work ingress component receiving a work request for a lower priority process, the work request sent from an external service (act 401). For example, work ingress component 101C can receive request 113 for low priority process 101. Request 113 can be send from an external service, such as, for example, a Web service, a further message queue, an HTTP application, etc.

Method 400 includes an act of the work ingress component creating a work reservation for the work request (act 402). For example, work ingress component 101C can create reservation 131 for request 112. Work ingress component 101C can send reservation 131 to pulse controller 102. Pulse controller 102 can receive reservation 131 from work ingress component 101C.

Method 400 includes an act of the pulse controller enqueueing the work reservation in a work queue (act 403). For example, pulse controller 102 can enqueue reservation 131 in work queue 103. Method 400 includes an act of the pulse controller returning a work token to the work ingress component, the work token for tracking the work reservation at the work ingress component (act 404). For example, pulse controller 102 can create token 132 and send token 132 to ingress component 101C. Work ingress component 101C can receive token 132 from pulse controller 102. Work ingress component 101C can use token 132 to track reservation 131.

Method 400 includes an act of the pulse controller determining that a time out interval is to expire prior to receiving an emitted clock pulse for the work reservation (act 405). For example, pulse controller 102 can determine that time out interval 166 is to expire prior to receiving an emitted pulse from variable speed clock 106 for reservation 131. Method 400 includes an act of the pulse controller removing the work reservation from the work queue (act 406). For example, pulse controller 102 can remove reservation 131 from work queue 103 in response to determining that time out interval 166 is to expire prior to receiving an emitted pulse from variable speed clock 106

Method 400 includes an act of the pulse controller notifying the work ingress component, using the work token, that the work reservation has not been fulfilled (act 407). For example, pulse controller 102 can send unfulfilled 133, including work token 132, to work ingress component 101C. Work ingress component 101C can receive unfulfilled 133 from pulse controller 102. Unfullfilled 133 indicates that work reservation 131 has not been fulfilled (i.e., that resources cannot be allocated to perform work requested in request 112). Method 400 includes an act of the work ingress component rejecting the work request (act 408). For example, work ingress component 101C can send rejection 114 for request 113 in response to receiving unfulfilled 133. Rejection 114 can be transmitted back to an external service that sent request 113.

Generally, a cancellation handler can be used to cancel a work request subsequent to attempting to acquire a work request reservation. A work ingress component receives a work request. For example, work ingress component 101A can receive request 109. The work ingress component creates a work reservation with a pulse controller for the work request. For example, work ingress component 101A can create reservation 173 with pulse controller 102 for request 109. Pulse controller 102 enqueues reservation 173 in work queue 103.

An application implementation provides a work token to the work ingress components for tracking the work reservation. For example, application 171 can provide token 174 to work ingress component 101A. The work ingress component associates the work token with the work reservation. For example, work ingress component 101A can associated token 174 with reservation 173

The cancellation handler registers a plurality of work tokens for coordinating the cancellation of work. For example, cancellation handler 104 can register token 174 and other tokens 176 for coordinating the cancellation of work. The application implementation issues a cancellation request to the cancellation handler. For example, application 171 can issue cancellation 172 to cancellation handler 104. The cancellation handler notifies appropriate components, using the work token, to remove the work reservation from the work queue. For example, cancellation handler 104 can notify pulse controller 102, using token 174, to remove reservation 173 form work queue 103.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system including a variable speed clock and a pulse controller, the variable speed clock defining a clock frequency for emitting clock pulses, the clock frequency based on a resource load being consumed by higher priority processes, the pulse controller for matching work items to emitted clock pulses, a method for accepting a work request for a lower priority process, the method comprising:

an act of a work ingress component receiving a work request for a lower priority process, the work request sent from an external service;

an act of the work ingress component creating a work reservation for the work request;

an act of the pulse controller enqueueing the work reservation in a work queue;

an act of the pulse controller returning a work token to the work ingress component, the work token for tracking the work reservation at the work ingress component;

an act of the pulse controller receiving a pulse, the clock pulse emitted from the variable speed clock in accordance with the clock frequency;

an act of the pulse controller dequeueing the work reservation from the work queue;

an act of the pulse controller notifying the work ingress component, using the work token, that the work reservation has been fulfilled; and an act of the work ingress component accepting the work request.

2. The method as recited in claim 1, wherein the work ingress component receiving a work request for a lower priority process comprises an act of a component selected from among: a web service endpoint, an RPC call, an http application, and a system API, receiving a work request for a lower priority process.

3. The method as recited in claim 1, wherein the work ingress component receiving a work request for a lower priority process comprises an act of a message queue receiving a work request for a lower priority process.

4. The method as recited in claim 1, wherein the variable speed clock is emitting pulses at a current frequency, further comprising:

for each sensor in a group of one or more sensors, an act of taking a sample measurement of the current availability of the corresponding system resource the sensor is configured to monitor an act of determining the resource utilization of the computer system based on the sample measurements;

an act of issuing a clock rate adjustment to the variable speed clock, the clock rate adjustment instructing the variable speed clock to adjust its clock rate to align more closely with the determined utilization of the computer system;

an act of calculating a new clock frequency based on the current clock frequency and the clock rate adjustment; and an act of calculating a time to emit a next clock pulse based on the new clock frequency.

5. The method as recited in claim 4, wherein the act of the pulse controller receiving a pulse in accordance with the clock frequency comprises an act of receiving an emitted pulse in accordance with the new clock frequency.

6. The method as recited in claim 4, further comprising an act of specifying an artificial resource pressure level for a system resource; and wherein the act of determining the resource utilization of the computer system based on the sample measurements comprises an act of adjusting the determined resource utilization by the resource pressure level.

7. The method as recited in claim 1, wherein the computer system is one of a plurality of computer systems competing for the work request; and wherein the act of the work ingress component accepting the work request comprises an act of the work ingress component transmitting an acknowledgment for the work request.

8. At a computer system including one or more processors and system memory, the computer system including a variable speed clock and a pulse controller, the variable speed clock defining a clock frequency for emitting clock pulses, the clock frequency based on a resource load being consumed by higher priority processes, the pulse controller for matching work items to emitted clock pulses, a method for rejecting a work request for a lower priority process, the method comprising:

an act of a work ingress component receiving a work request for a lower priority process, the work request sent from an external service;

an act of the work ingress component creating a work reservation for the work request;

an act of the pulse controller enqueueing the work reservation in a work queue;

an act of the pulse controller returning a work token to the work ingress component, the work token for tracking the work reservation at the work ingress component;

an act of the pulse controller determining the work reservation is to be removed from the work queue prior to receiving an emitted clock pulse for the work reservation;

an act of the pulse controller removing the work reservation from the work queue;

an act of the pulse controller notifying the work ingress component, using the work token, that the work reservation has not been fulfilled; and an act of the work ingress component rejecting the work request.

9. The method as recited in claim 8, wherein the work ingress component receiving a work request for a lower priority process comprises an act of a component selected from among: a web service endpoint, an RPC call, an http application, and a system API, receiving a work request for a lower priority process.

10. The method as recited in claim 8, wherein the work ingress component receiving a work request for a lower priority process comprises an act of a message queue receiving a work request for a lower priority process.

11. The method as recited in claim 8, wherein the variable speed clock is emitting pulses at a current frequency, further comprising:

for each sensor in a group of one or more sensors, an act of taking a sample measurement of the current availability of the corresponding system resource the sensor is configured to monitor an act of determining the resource utilization of the computer system based on the sample measurements;

an act of issuing a clock rate adjustment to the variable speed clock, the clock rate adjustment instructing the variable speed clock to adjust its clock rate to align more closely with the determined utilization of the computer system;

an act of calculating a new clock frequency based on the current clock frequency and the clock rate adjustment; and an act of calculating a time to emit a next clock pulse based on the new clock frequency.

12. The method as recited in claim 11, wherein the act of the pulse controller determining the work reservation is to be removed from the work queue prior to receiving an emitted clock pulse for the work reservation comprises an act of the pulse controller determining that a time out interval is to expire prior to receiving an emitted clock pulse in accordance with the new clock frequency.

13. The method as recited in claim 11, the method further comprising an act of specifying an artificial resource pressure level for a system resource; and wherein the act of determining the resource utilization of the computer system based on the sample measurements comprises an act of adjusting the determined resource utilization by the resource pressure level.

14. The method as recited in claim 8, wherein the computer system is one of a plurality of computer systems competing for the work request; and     wherein the act of the work ingress component rejecting the work request comprises an act of the work ingress component transmitting a rejection for the work request.

15. The method as recited in claim 8, wherein the act of the pulse controller determining the work reservation is to be removed from the work queue prior to receiving an emitted clock pulse for the work reservation comprises an act of the pulse controller determining that a time out interval is to expire prior to receiving an emitted clock pulse for the work reservation.

16. The method as recited in claim 8, wherein the act of the pulse controller determining the work reservation is to be removed from the work queue prior to receiving an emitted clock pulse for the work reservation comprises an act of the pulse controller receiving a cancellation message from a cancellation coordinator, the cancellation message including the work token.

17. A system for using pulses to control work ingress, the system comprising:

one or more processors;

system memory;

one or more computer storage media having stored thereon computer-executable instructions representing one or more sensors, a load monitor, a variable speed clock, a pulse controller, a cancellation handler, a work queue, and one or more work ingress components, wherein the one or more sensors are configured to:

monitor resource availability and transmit signals related to resource availability to the load monitor;

wherein the load monitor is configured to:

determine whether the computer system has available resource for higher priority processes in response to signals received from the sensors; and         send clock rate adjustments to the variable speed clock component, the clock rate adjustments based on the availability of resources for higher priority processes;

wherein the variable speed clock component is configured to:

receive clock rate adjustments from the load monitor;

dynamically adjust a clock frequency for emitting clock pulses based on received clock rate adjustments; and         emit clock pulses in accordance with dynamically adjusted clock frequencies;

wherein the pulse controller is configured to:

receive a work request from a work ingress component for a lower priority process, the work request sent from an external service;

create a work reservation for the work request;

enqueue the work reservation in a work queue;

return a work token to the work ingress component, the work token for tracking the work reservation at the work ingress component;

when a clock pulse is received for the work reservation prior to a time out interval:

dequeue the work reservation from the work queue; and             notify the work ingress component, using the work token, that the work reservation has been fulfilled; and         when a clock pulse is not going to be received for the work reservation prior to a time out interval:

remove the work reservation from the work queue; and             notify the work ingress component, using the work token, that the work reservation has not been fulfilled;

wherein the one or more work ingress components are configured to:

receive a work request for a lower priority process, the work request sent from an external service;

receive a work token from the pulse controller, the work token for tracking the work request;

accept or reject the work request in accordance with notifications from the pulse controller; and     wherein the cancellation handler is configured to:

coordinate the cancellation of work with voiding a work reservation.

18. The system as recited in claim 17, wherein the one or more sensors being configured to monitor resource availability and transmit signals related to resource availability to the load monitor comprises the one or more sensors being configured to for each sensor in a group of one or more sensors, take a sample measurement of the current availability of a corresponding system resource the sensor is configured to monitor.

19. The system as recited in claim 18, wherein the load monitor is further configured to set an artificial resource pressure level for a system resource; and     wherein the load monitor being configured to determine whether the computer system has available resources for higher priority processes in response to signals received from the sensors comprises the load monitor being configured to adjust the determined resource utilization by the resource pressure level.

20. The system as recited in claim 17, wherein the system is one of a plurality of systems competing for the work request; and     wherein the work ingress component being configured to accept or reject the work request in accordance with notifications from the pulse controller comprises the work ingress component being configured to transmit an acknowledgment or rejection for the work request.

\* \* \* \* \*